(12) United States Patent
Gehring et al.

(10) Patent No.: US 7,278,912 B2
(45) Date of Patent: Oct. 9, 2007

(54) AIR DUCT OUTLETS HAVING SELF-OSCILLATING AIR DEFLECTION MEMBERS

(75) Inventors: Thomas F. J. Gehring, Scarborough (CA); Ireneusz Jankowski, Richmond Hill (CA); Dejan Havidic, Toronto (CA); Jeffrey A. McKerrall, Toronto (CA); Douglas Lim Hester, Scarborough (CA)

(73) Assignee: Collins & Aikman Products Co., Troy, MI (US)

( * ) Notice: Subject to any disclaimer, the term of this patent is extended or adjusted under 35 U.S.C. 154(b) by 82 days.

(21) Appl. No.: 11/046,966

(22) Filed: Jan. 31, 2005

(65) Prior Publication Data
US 2005/0176362 A1    Aug. 11, 2005

Related U.S. Application Data

(60) Provisional application No. 60/542,035, filed on Feb. 5, 2004.

(51) Int. Cl.
*B60H 1/34* (2006.01)

(52) U.S. Cl. .................................................. 454/153

(58) Field of Classification Search ................. 454/153
See application file for complete search history.

(56) References Cited

U.S. PATENT DOCUMENTS 4,250,799 A * 2/1981 Stouffer .................... 454/125
5,259,815 A * 11/1993 Stouffer et al. ............. 454/125

* cited by examiner

*Primary Examiner*—Steven McAllister
*Assistant Examiner*—Helena Kosanovic
(74) *Attorney, Agent, or Firm*—Myers Bigel Sibley & Sajovec, P.A.

(57) ABSTRACT

An air duct outlet housing has spaced-apart top and bottom walls, and spaced-apart first and second side walls that define an air passageway with an inlet and outlet. First and second air deflection members include elongated first and second panels with respective proximal and distal end portions. A flange extends from each distal end portion of the respective first and second panels. The first and second panel proximal ends are pivotally secured to the housing and are movable between first and second positions. The first and second panels are in face-to-face relationship with the respective first and second side walls when in respective first positions. The first and second panels extend in respective directions that are transverse to the respective first and second side walls when in respective second positions.

22 Claims, 7 Drawing Sheets

AIR DUCT OUTLETS HAVING SELF-OSCILLATING AIR DEFLECTION MEMBERS

RELATED APPLICATION

This application claims the benefit of U.S. Provisional Application No. 60/542,035 filed Feb. 5, 2004, the disclosure of which is incorporated herein by reference in its entirety as if set forth fully herein.

FIELD OF THE INVENTION

The present invention relates generally to vehicles and, more particularly, to air duct outlets utilized within vehicles.

BACKGROUND OF THE INVENTION

Conventionally, vehicle interiors are provided with one or more air duct outlets which are connected by ducts to an outside air source and/or to a heating and/or air conditioning system that provides cooled and/or heated air. Because it is generally desirable for vehicle occupants to be able to adjust the direction of air flow within a vehicle interior, air duct outlets are typically provided with adjustable vanes or louvers. In addition, air duct outlets may be provided with dampers for allowing vehicle occupants to control the amount of air flowing therethrough.

Conventional air duct outlets utilize one or more sets of louvers to mechanically redirect air streams. While this technology is proven and successful, the louver assemblies can be complex and expensive to manufacture. In addition, conventional air duct outlets typically provide an air stream deflection range up to only about 90° (i.e., −45° to +45° relative to a centerline of the air duct outlet). Deflection ranges in excess of ±45° typically result in large pressure drops and lower air flow rates, which are undesirable.

In addition, air duct outlets are conventionally designed to allow the passage of a large amount of air so that the cabin of a vehicle can be cooled/heated as rapidly as possible. However, passengers typically can only tolerate relatively high airflow rates for a limited duration before starting to feel uncomfortable. This problem has been addressed by the use of oscillating air duct outlets wherein the direction of airflow oscillates back and forth such that a passenger experiences direct airflow only for limited durations. For example, the Mazda 626 automobile incorporates an oscillating air duct outlet. This air duct outlet uses a small, dc motor (geared down to low rotational speed) to drive a crank which, through a shaft, mechanically moves air-directing louvers back and forth in an oscillating pattern, thereby imparting a sweeping motion to an air stream.

Unfortunately, the use of motors and associated rotational linkages to generate oscillating air stream motion can be somewhat complicated and expensive. Vehicle manufacturers are continuously seeking components, such as air duct outlets, that have enhanced functionality (such as oscillation capability) and durability, yet are cost effective to manufacture. Vehicle manufacturers are also continuously seeking components, such as air duct outlets, that can enhance styling within a vehicle, yet remain functional and economical.

SUMMARY OF THE INVENTION

In view of the above discussion, an air duct outlet, according to embodiments of the present invention, includes a housing having spaced-apart top and bottom walls, and spaced-apart first and second side walls extending between the top and bottom walls to define an air passageway having an inlet and outlet. The side walls diverge in a downstream direction from the inlet to the outlet and may have a generally linear configuration, a convexly curved configuration, or a configuration that includes linear and convexly curved portions. A first air deflection member is provided that includes an elongated first panel having opposite proximal and distal end portions. A flange extends from the first panel distal end portion at an angle that is substantially transverse to the first panel. The first panel proximal end is pivotally secured to the housing adjacent the first side wall such that the first air deflection member is movable between a first position wherein the first panel is in face-to-face relationship with the first side wall and a second position wherein the first panel extends in a direction that is transverse to the first side wall. A second air deflection member is provided that includes an elongated second panel having opposite proximal and distal end portions. A flange extends from the second panel distal end portion at an angle that is substantially transverse to the second panel. The second panel proximal end is pivotally secured to the housing adjacent the first side wall such that the second air deflection member is movable between a first position wherein the second panel is in face-to-face relationship with the second side wall and a second position wherein the second panel extends in a direction that is transverse to the second side wall. An air stream flowing through the air passageway causes the first and second air deflection members to oscillate between their respective first and second positions. Oscillation of the first and second air deflection members imparts an oscillating, sweeping motion on the air stream as the air stream exits from the outlet.

Air duct outlets, according to embodiments of the present invention, may be used within vehicles and may be used in other applications including, but not limited to buildings.

BRIEF DESCRIPTION OF THE DRAWINGS

The accompanying drawings, which form a part of the specification, illustrate embodiments of the present invention. The drawings and description together serve to fully explain the invention.

DETAILED DESCRIPTION OF THE INVENTION

Figure 1:
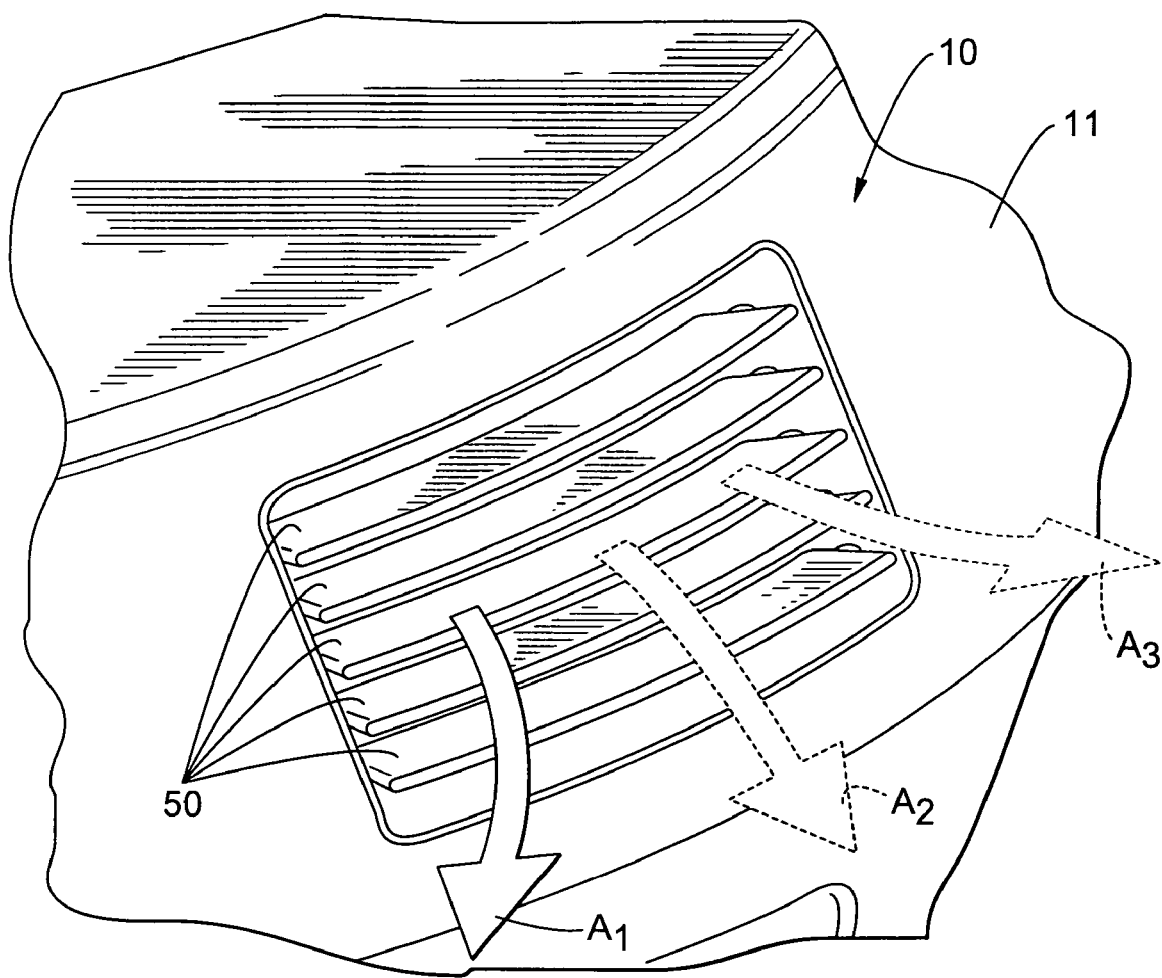
FIG. 1 is a front, perspective view of an air duct outlet in a flush-mounted position relative to an instrument panel of a vehicle, according to embodiments of the present invention.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the drawings, the thickness of lines, layers and regions may be exaggerated for clarity. It will be understood that when an element is referred to as being "on" another element, it can be directly on the other element or intervening elements may also be present. In contrast, when an element is referred to as being "directly on" another element, there are no intervening elements present. It will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present. The terms "upwardly", "downwardly", "vertical", "horizontal" and the like are used herein for the purpose of explanation only.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, the term "and/or" includes any and all combinations of one or more of the associated listed items.

Referring to FIGS. 1-9, an air duct outlet 10, that imparts an oscillating, sweeping motion to an air stream, according to embodiments of the present invention, is illustrated. The illustrated air duct outlet 10 is designed for use within the interior compartments of vehicles, such as automobiles, trucks, trains, boats, aircraft, and the like. However, it is understood that air duct outlets according to embodiments of the present invention may be utilized in various environments (e.g., in homes and offices) and are not limited only to use in vehicles.

In FIG. 1, air duct outlet 10 is installed within the instrument panel 11 of a vehicle. Arrows $A_1, A_2, A_3$ indicate the range of directions of an air stream exiting the air duct outlet 10 in an oscillating, sweeping motion. The illustrated air duct outlet 10 includes a plurality of generally horizontal vanes or louvers 50 that allow a user to adjust up and down directions of an oscillating, sweeping air stream exiting from the air duct outlet 10. Embodiments of the present invention are not limited to the illustrated louvers 50. Louvers of various shapes, sizes and orientation can be utilized in accordance with embodiments of the present invention. Moreover, embodiments of the present invention, however, do not require louvers.

Figure 2:
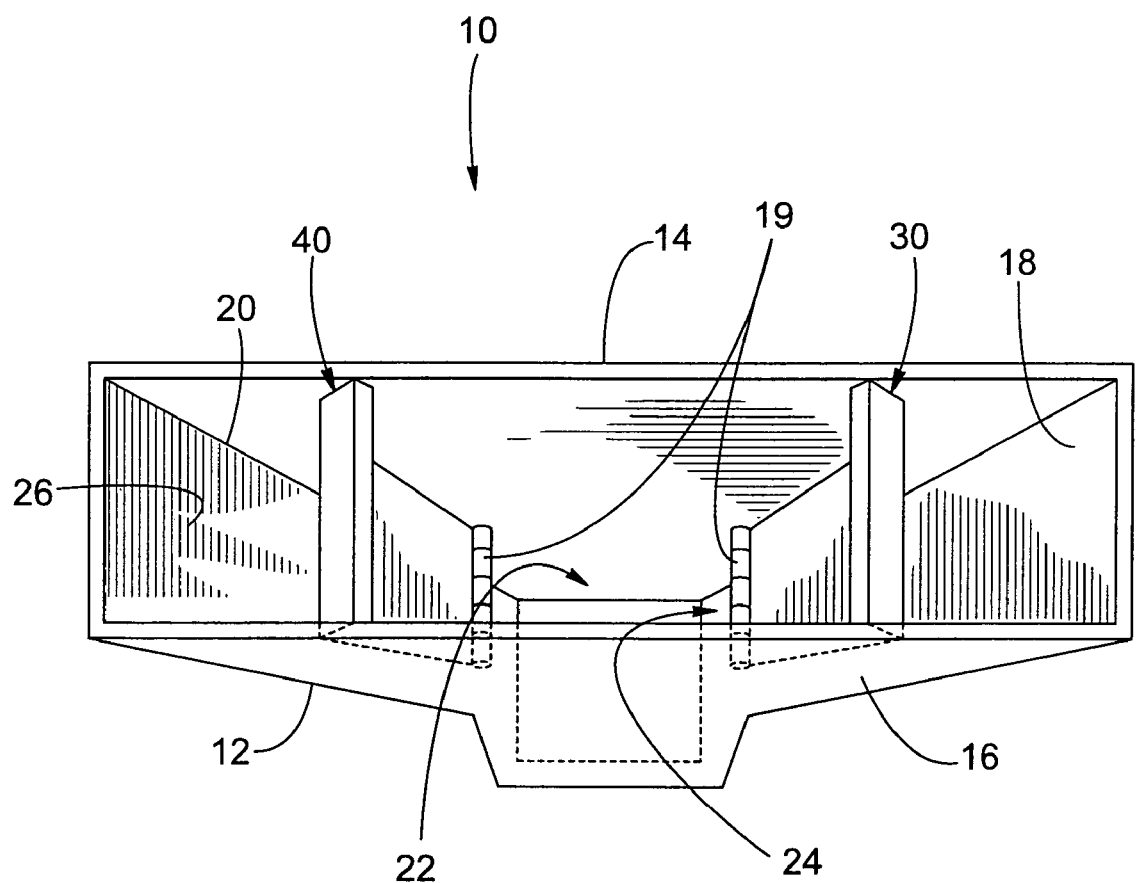
FIG. 2 is a perspective view of the air duct outlet of FIG. 1 that illustrates the V-shaped air passageway of the air duct outlet, according to embodiments of the present invention.
Figure 3:
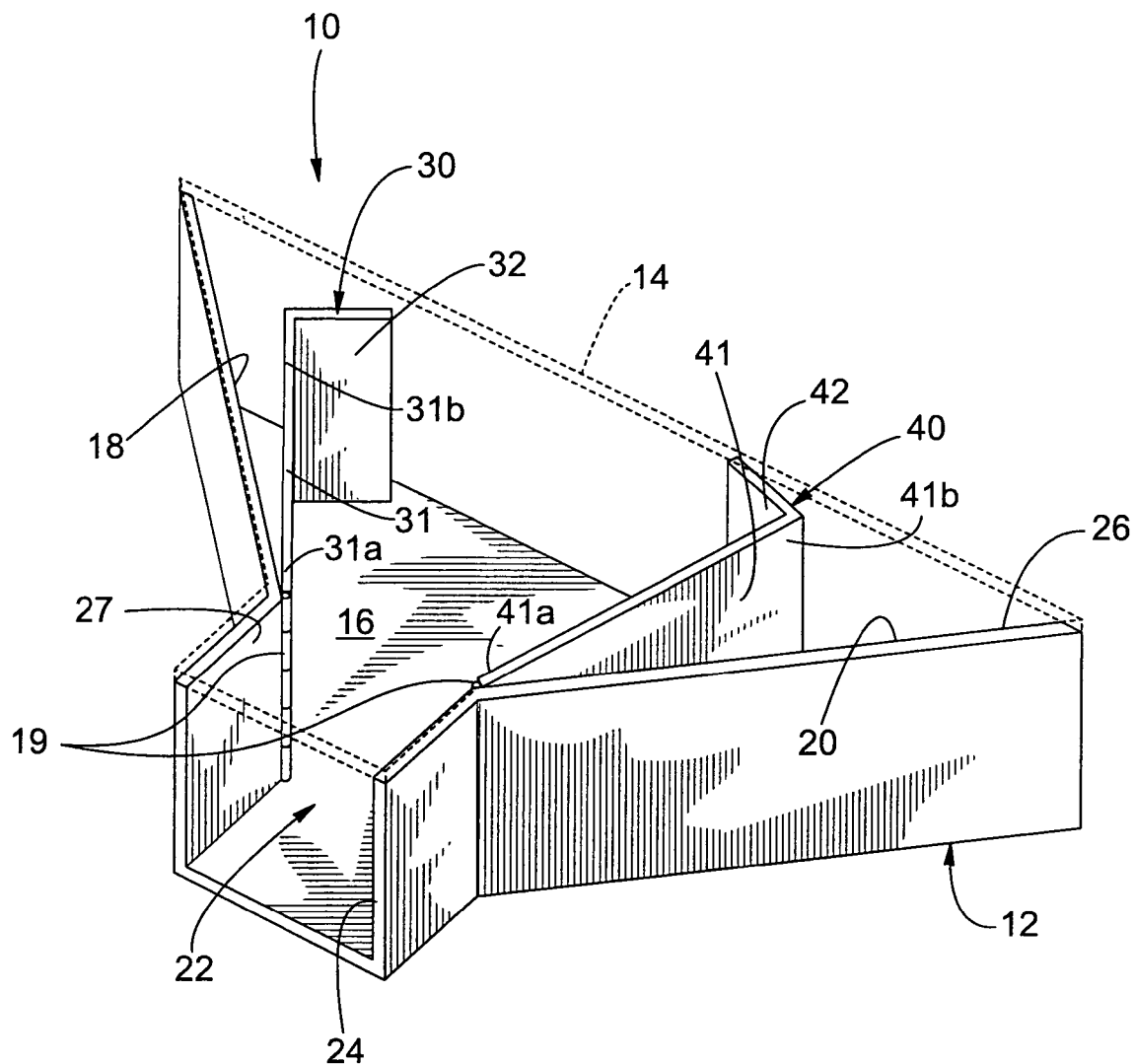
FIG. 3 is a perspective view of the air duct outlet of FIG. 1 with the housing top wall removed for clarity to illustrate the first and second air deflection members, according to embodiments of the present invention.

Referring to FIGS. 2-3, the illustrated air duct outlet 10 includes a housing 12 having spaced-apart top and bottom walls 14, 16, and spaced-apart first and second side walls 18, 20. The side walls 18, 20 extend between the top and bottom walls 14, 16 to define an air passageway 22 that has an inlet 24, and outlet 26, and a throat region 27 downstream from the inlet 24, as illustrated. In the illustrated embodiment, the side walls 18, 20 have a generally linear configuration and diverge in a downstream direction (i.e., diverge from the throat region 27 toward the outlet 26) to give the air passageway 22 a flared, V-shaped configuration.

Figure 4:
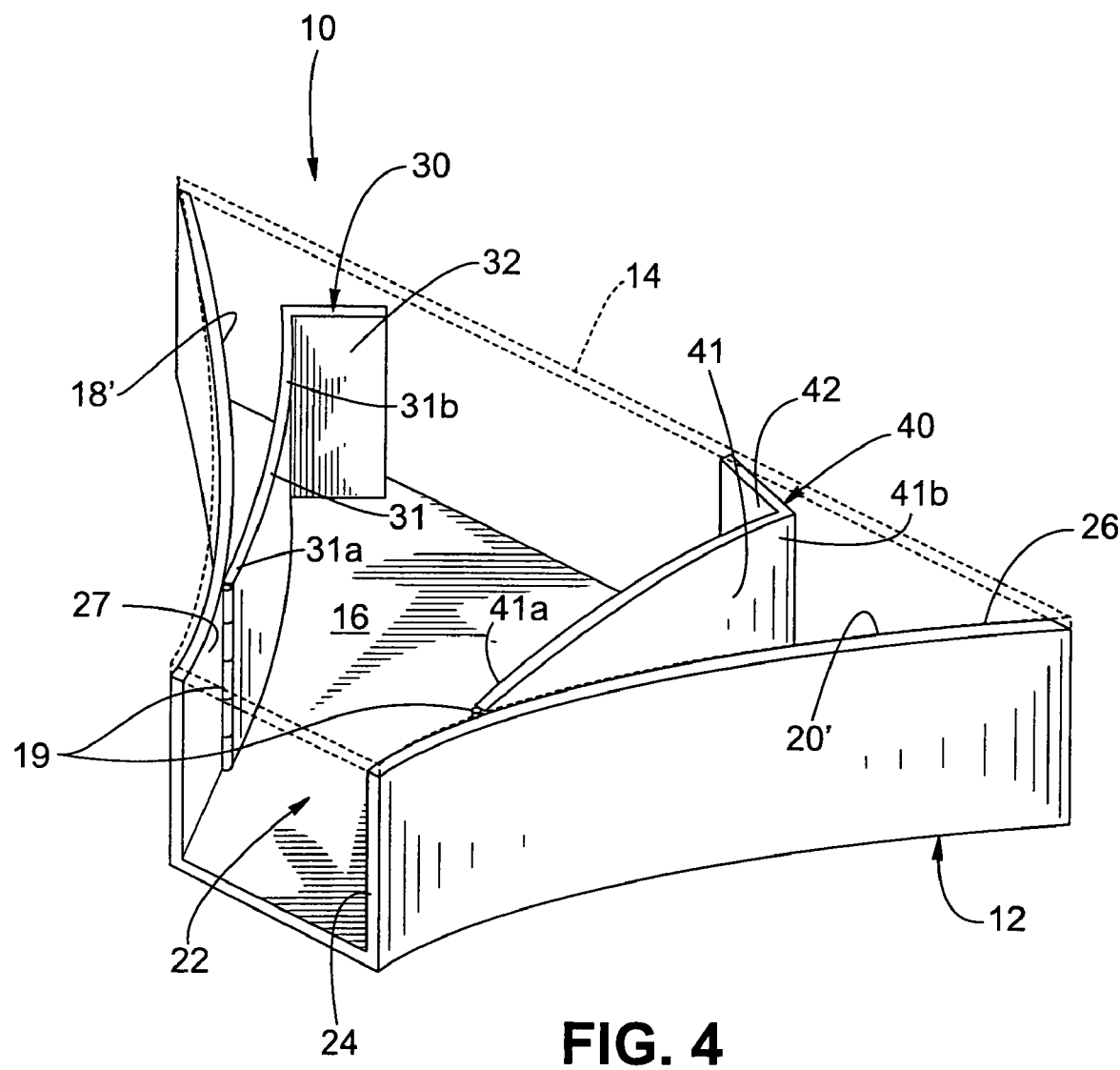
FIG. 4 is a perspective view of an air duct according to embodiments of the present invention wherein the side walls thereof have a convex configuration, and wherein the first and second air deflection members have respective elongated first and second panels with convexly curved configurations.

Side walls 18, 20 can have other shapes and configurations and are not limited to the illustrated embodiment. For example, as illustrated in FIG. 4, side walls 18', 20' can have convexly curved configurations. According to embodiments of the present invention, end portions of the first and second panels 18', 20' at air passageway outlet 26 may be generally parallel as a result of the convexly curved configuration of first and second panels 18', 20'. As such, an air stream exiting from the outlet 26 could oscillate within a range of between about +90° and −90° relative to a direction normal to the outlet 26. However, air streams can oscillate within various ranges of angles depending on the configuration of the side walls of an air duct outlet 10, according to embodiments of the present invention.

Referring back to FIGS. 2-3, the illustrated air duct outlet 10 also includes first and second air deflection members 30, 40, each having a generally L-shaped configuration. The first air deflection member 30 includes an elongated first panel 31 having opposite proximal and distal end portions 31a, 31b, and a flange 32 that extends from the first panel distal end portion 31b at an angle substantially transverse to the first panel 31 to form the L-shaped configuration. The flange 32 may extend from the first panel distal end portion 31b within a range of angles, and is not limited to a particular angle. An exemplary range of angles may include between about thirty degrees and about one hundred fifty degrees (30°-150°). However, embodiments of the present invention are not limited to this range. Moreover, first panel 31 and flange 32 may have various shapes and configurations, and are not limited to the illustrated configurations.

Figure 7:
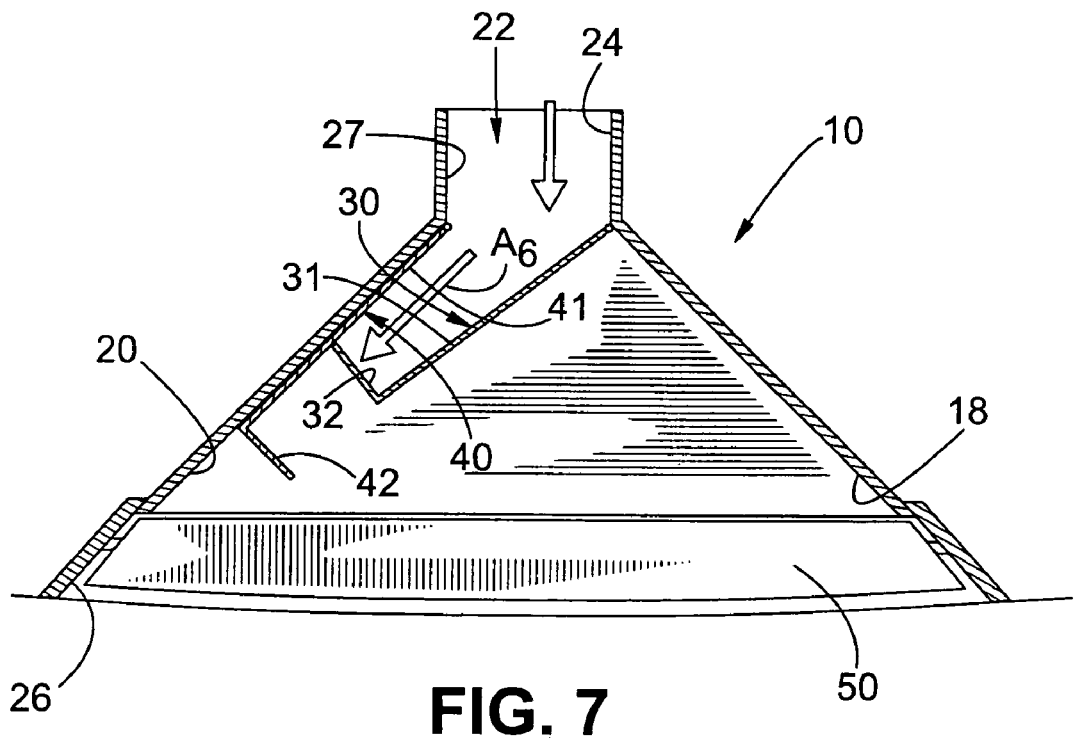

The first panel proximal end portion 31a of the first air deflection member 30 is pivotally secured to the housing adjacent the first side wall 18 and near the air passageway throat 27 via hinge 19, as illustrated. Hinge 19 may be any type of hinge. The first air deflection member 30 is movable within a range of positions bounded by a first position wherein the first panel 31 is generally in face-to-face relationship with the first side wall 18 (FIG. 5) and a second position wherein the first panel 31 extends in a direction that is generally transverse to the first side wall 18 (FIG. 7). In the illustrated embodiment, the first panel 31 is substantially orthogonal with the first side wall 18 when in the second position. The first panel 31 may be in contacting face-to-face relationship or in spaced-apart face-to-face relationship with the first side wall 18 when in the first position.

Similarly, the second air deflection member 40 includes an elongated second panel 41 having opposite proximal and distal end portions 41a, 41b, and a flange 42 that extends from the second panel distal end portion 41b at an angle substantially transverse to the second panel to form the L-shaped configuration. The flange 42 may extend from the second panel distal end portion 41b within a range of angles, and is not limited to a particular angle. An exemplary range of angles may include between about thirty degrees and about one hundred fifty degrees (30°-150°). However, embodiments of the present invention are not limited to this range. Moreover, second panel 41 and flange 42 may have various shapes and configurations.

The second panel proximal end portion 41a of the second air deflection member 40 is pivotally secured to the housing 12 adjacent the second side wall 20 and near the air passageway throat 27 via hinge 19, as illustrated. Hinge 19 may be any type of hinge. The second air deflection member 40 is movable within a range of positions bounded by a first position wherein the second panel 41 is generally in face-to-face relationship with the second side wall 20 and a second position wherein the second panel 41 extends in a direction that is substantially transverse to the second side wall 20. The second panel 41 may be in contacting face-to-face relationship or in spaced-apart face-to-face relationship with the second side wall 20 when in the first position.

An air stream flowing through the flared air passageway 22 causes the first and second air deflection members 30, 40 to oscillate in repeating fashion within their respective ranges of motion (i.e., between their respective first and second positions). This oscillation of the first and second air deflection members 30, 40 imparts an oscillating, sweeping motion on the air stream as the air stream exits from the air passageway outlet 26.

Figure 5:
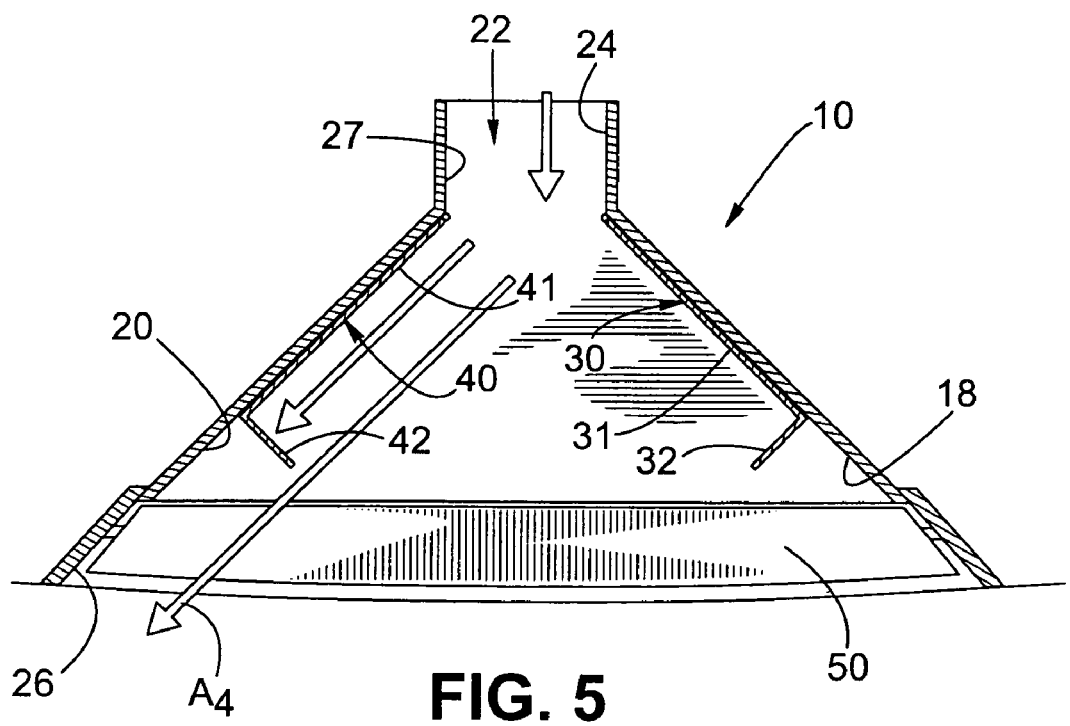
FIGS. 5-9 are top plan views of the air duct outlet of FIG. 1 with the housing top wall removed for clarity and that illustrate how the air deflection members oscillate to impart a sweeping motion to an air stream flowing through the air passageway.
Figure 6:
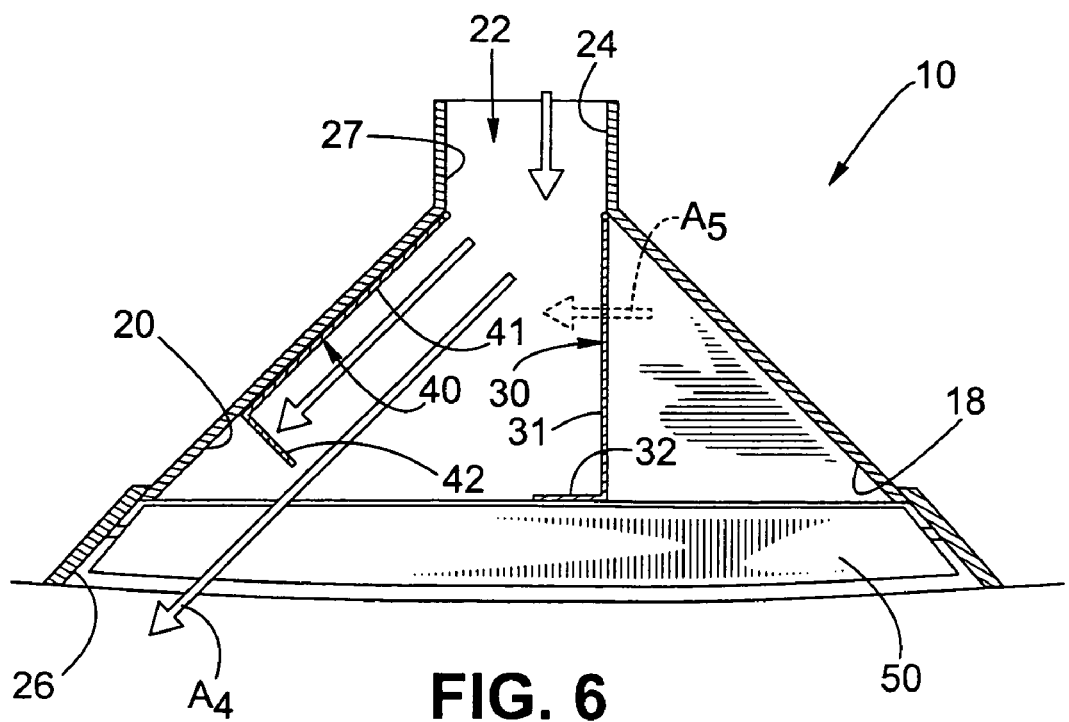

Referring to FIGS. 5-9, the oscillation of the first and second air deflection members 30, 40 is illustrated. FIG. 5 illustrates the air duct outlet 10 when the flow of an air stream from an air source (not shown) and through the air passageway 22 via the inlet 24 is initiated. In the illustrated embodiment, the first and second air deflection members 30, 40 are each in their respective first positions (i.e., the first and second panels 31, 41 are in face-to-face relationship with the first and second side walls 18, 20, respectively).

The flared configuration of the air passageway 22 causes the air stream to follow one of the first or second side walls 18, 20 as a result of the "Coanda effect." As known to those skilled in the art, the Coanda effect is the tendency for a moving fluid (either liquid or gas) to attach itself to a surface and flow along the surface. As a fluid moves across a surface, a certain amount of friction occurs between the surface and the fluid, which tends to slow down the fluid as it moves across the surface. This resistance to flow tends to pull the fluid towards the surface, making it adhere to the surface, even as it bends around corners.

As illustrated in FIG. 5, an air stream flowing through the air passageway 22 is adhering to the second side wall 20. (However, the air stream could also initially adhere to the first side wall 18). Accordingly, the illustrated air stream flows out of the air passageway 22 via the air passageway outlet 26 with a direction substantially parallel with the direction of the second side wall 20 (illustrated by arrow $A_4$). The selection of one side or the other of the air passageway 22 by an air stream is known as a bi-stable state since there are two stable positions that the air stream can follow (left side or right side of the air passageway 22).

The air stream flow illustrated in FIG. 5 creates stagnation pressure on the second air deflection member 40 that maintains the second air deflection member 40 in the position against the second side wall 20. The first air deflection member 30 experiences a lift force (indicated by arrow As in FIG. 6) from the flow of the air stream along the second side wall 20 and, acting similar to a wing, the first air deflection member 30 is drawn away from the first side wall 18 and toward the second air deflection member 40, as illustrated. While the first air deflection member 30 is moving toward the second air deflection member 40, the airflow is holding the second air deflection member 40 against the second side wall 20.

Figure 8:
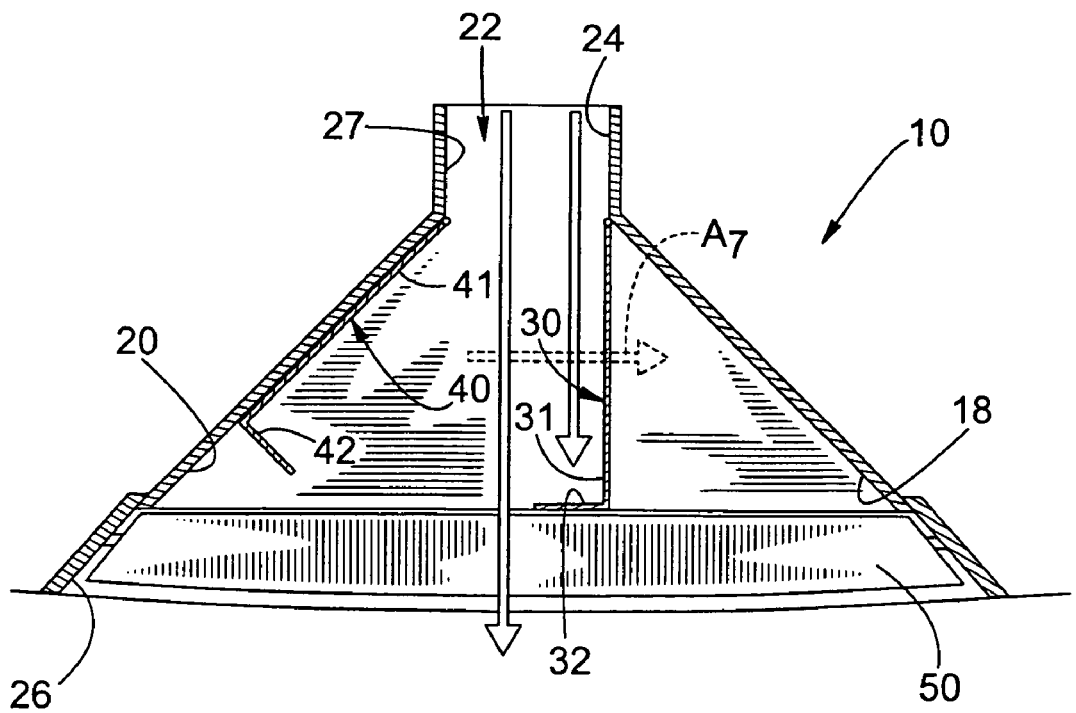

At a certain point, the flange 32 of the first air deflection member 30 moves into the air stream (FIGS. 6-8) whereupon the air stream exerts a force (indicated by arrow $A_6$) on the flange 32. This force causes the first air deflection member 30 to begin to move back toward the first side wall 18, as illustrated in FIG. 8 and indicated by arrow $A_7$). The air stream adheres to the first air deflection member 30 as it returns to the first side wall 18, causing the air stream to sweep across the width of the air passageway 22 from the second side wall 20 to the first side wall 18.

Figure 9:
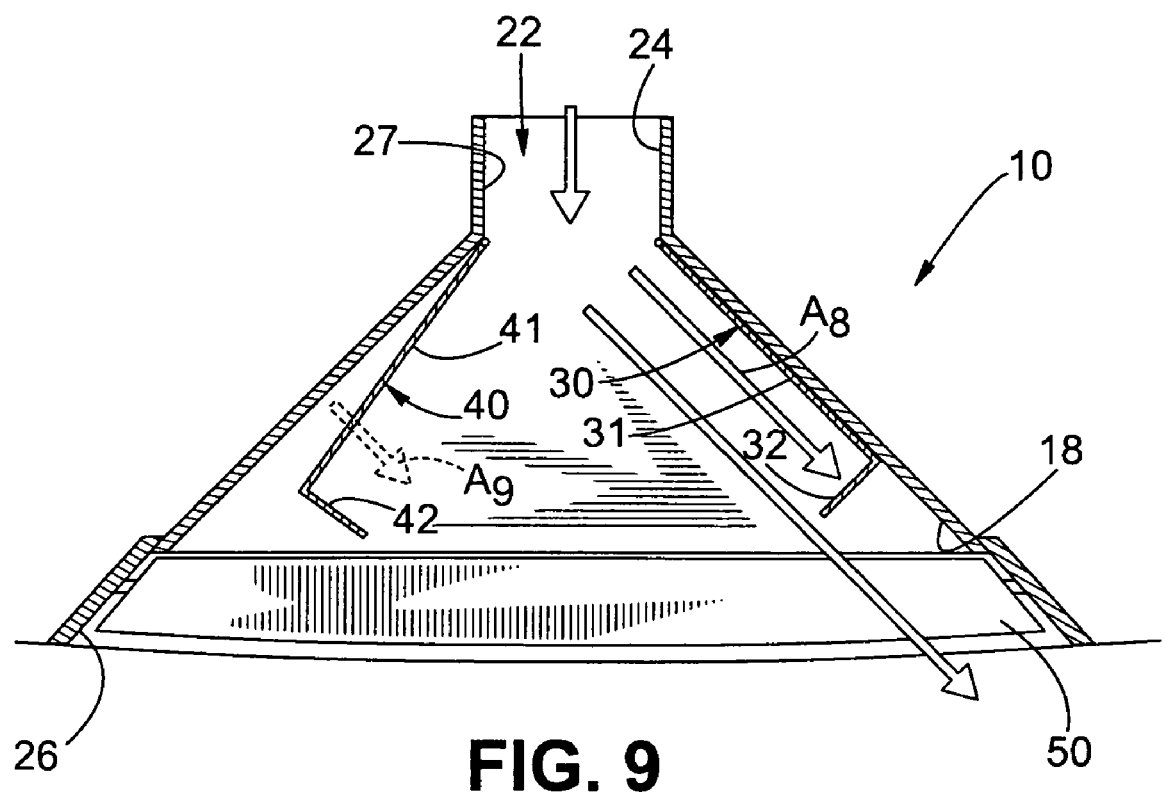

Referring to FIG. 9, the air stream is adhering to the first side wall 18, indicated by arrow $A_8$ and the second air deflection member 40 is being drawn toward the first air deflection member 30 (indicated by arrow $A_9$). The flange 42 of the second air deflection member 40 will become entrained within the air stream and this will cause the second air deflection member 40 to be pushed back toward the second side wall 20, thereby causing the air stream to sweep back toward the other side of the air passageway 22.

This sweeping pattern of the air stream is self-sustaining in that the power to draw the air deflection members 30, 40 across the air passageway 22 and bring the air stream back with it is supplied by the energy present in the airflow itself. The frequency of the sweeping pattern can be changed by changing sizes, shapes and/or orientations of the air deflection members 30, 40.

The air duct outlet 10 and the various components thereof, can be formed from various materials without limitation.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An air duct outlet, comprising:
   a housing comprising spaced-apart top and bottom walls, and spaced-apart first and second side walls extending between the top and bottom walls to define an air passageway having an inlet and outlet, and wherein the side walls diverge from the inlet to the outlet;
   a first air deflection member, comprising an elongated first panel having opposite proximal and distal end portions, and a flange extending from the first panel distal end portion at an angle substantially transverse to the first panel, wherein the first panel proximal end is pivotally secured to the housing at the first side wall and upstream from the first panel distal end such that the first air deflection member is movable between a first position wherein the first panel is in face-to-face relationship with the first side wall and a second position wherein the first panel extends in a direction that is transverse to the first side wall; and
   a second air deflection member, comprising an elongated second panel having opposite proximal and distal end portions, and a flange extending from the second panel distal end portion at an angle substantially transverse to the second panel, wherein the second panel proximal end is pivotally secured to the housing at the second side wall and upstream from the second panel distal end such that the second air deflection member is movable between a first position wherein the second panel is in face-to-face relationship with the second side wall and a second position wherein the second panel extends in a direction that is transverse to the second side wall;
   wherein an air stream flowing through the air passageway causes the first and second air deflection members to oscillate between their respective first and second positions, and wherein oscillation of the first and second air deflection members imparts an oscillating, sweeping motion on the air stream as the air stream exits from the outlet.

2. The air duct outlet of claim 1, wherein the first panel and flange of the first air deflection member are substantially orthogonal, and wherein the second panel and flange of the second air deflection member are substantially orthogonal.

3. The air duct outlet of claim 1, wherein the first panel is in face-to-face contacting relationship with the first side wall when the first air deflection member is in a respective first position, and wherein the second panel is in face-to-face contacting relationship with the second side wall when the second air deflection member is in a respective first position.

4. The air duct outlet of claim 1, wherein the first and second side walls are linear.

5. The air duct outlet of claim 1, wherein the air passageway has a generally V-shaped configuration.

6. The air duct outlet of claim 1, wherein the first and second side walls are convexly curved such that end portions of the first and second side walls at the air passageway outlet are substantially parallel.

7. The air duct outlet of claim 6, wherein an air stream flowing through the air passageway outlet is caused to oscillate within a range of between about +90° and −90° relative to a direction normal to the air passageway outlet.

8. The air duct outlet of claim 1, wherein the first and second side walls are convexly curved and wherein the first and second air deflection members have convexly curved elongated first and second panels, respectively.

9. A vehicle, comprising:
an instrument panel; and
an air duct outlet disposed within the instrument panel, wherein the air duct outlet receives air from an air source and imparts a sweeping motion to the air stream as the air stream exits from the air duct outlet, wherein the air duct outlet comprises:
a housing comprising spaced-apart top and bottom walls, and spaced-apart first and second side walls extending between the top and bottom walls to define an air passageway having an inlet and outlet, and wherein the side walls diverge from the inlet to the outlet;
a first air deflection member, comprising an elongated first panel having opposite proximal and distal end portions, and a flange extending from the first panel distal end portion at an angle substantially transverse to the first panel, wherein the first panel proximal end is pivotally secured to the housing at the first side wall and upstream from the first panel distal end such that the first air deflection member is movable between a first position wherein the first panel is in face-to-face relationship with the first side wall and a second position wherein the first panel extends in a direction that is transverse to the first side wall; and
a second air deflection member, comprising an elongated second panel having opposite proximal and distal end portions, and a flange extending from the second panel distal end portion at an angle substantially transverse to the second panel, wherein the second panel proximal end is pivotally secured to the housing at the second side wall and upstream from the second panel distal end such that the second air deflection member is movable between a first position wherein the second panel is in face-to-face relationship with the second side wall and a second position wherein the second panel extends in a direction that is transverse to the second side wall;

wherein an air stream flowing through the air passageway causes the first and second air deflection members to oscillate between respective first and second positions, and wherein oscillation of the first and second air deflection members imparts a sweeping motion on the air stream as the air stream exits from the outlet.

10. The vehicle of claim 9, wherein the first panel and flange of the first air deflection member are substantially orthogonal, and wherein the second panel and flange of the second air deflection member are substantially orthogonal.

11. The vehicle of claim 9, wherein the first panel is in face-to-face contacting relationship with the first side wall when the first air deflection member is in a respective first position, and wherein the second panel is in face-to-face contacting relationship with the second side wall when the second air deflection member is in a respective first position.

12. The vehicle of claim 9, wherein the first and second side walls are linear.

13. The vehicle of claim 9, wherein the air passageway has a generally V-shaped configuration.

14. The vehicle of claim 9, wherein the first and second side walls are convexly curved such that end portions of the first and second side walls at the air passageway outlet are substantially parallel.

15. The vehicle of claim 14, wherein an air stream flowing through the air passageway outlet is caused to oscillate within a range of between about +90° and −90° relative to a direction normal to the air passageway outlet.

16. The vehicle of claim 9, wherein the first and second side walls are convexly curved and wherein the first and second air deflection members have convexly curved elongated first and second panels, respectively.

17. An air duct outlet, comprising:
a housing comprising spaced-apart top and bottom walls, and spaced-apart linear first and second side walls extending between the top and bottom walls to define an air passageway with a V-shaped configuration having an inlet and outlet, and wherein the side walls diverge from the inlet to the outlet;
a first air deflection member, comprising an elongated first panel having opposite proximal and distal end portions, and a flange extending from the first panel distal end portion at an angle substantially transverse to the first panel, wherein the first panel proximal end is pivotally secured to the housing at the first side wall and upstream from the first panel distal end such that the first air deflection member is movable between a first position wherein the first panel is in face-to-face relationship with the first side wall and a second position wherein the first panel extends in a direction that is transverse to the first side wall; and
a second air deflection member, comprising an elongated second panel having opposite proximal and distal end portions, and a flange extending from the second panel distal end portion at an angle substantially transverse to the second panel, wherein the second panel proximal end is pivotally secured to the housing at the second side wall and upstream from the second panel distal end such that the second air deflection member is movable between a first position wherein the second panel is in face-to-face relationship with the second side wall and a second position wherein the second panel extends in a direction that is transverse to the second side wall;
wherein an air stream flowing through the air passageway causes the first and second air deflection members to oscillate between their respective first and second positions, and wherein oscillation of the first and second air deflection members imparts an oscillating, sweeping motion on the air stream as the air stream exits from the outlet.

18. The air duct outlet of claim 17, wherein the first panel and flange of the first air deflection member are substantially orthogonal, and wherein the second panel and flange of the second air deflection member are substantially orthogonal.

19. The air duct outlet of claim 17, wherein the first panel is in face-to-face contacting relationship with the first side wall when the first air deflection member is in a respective first position, and wherein the second panel is in face-to-face contacting relationship with the second side wall when the second air deflection member is in a respective first position.

20. A vehicle, comprising:
an instrument panel; and
an air duct outlet disposed within the instrument panel, wherein the air duct outlet receives air from an air source and imparts a sweeping motion to the air stream as the air stream exits from the air duct outlet, wherein the air duct outlet comprises:
a housing comprising spaced-apart top and bottom walls, and spaced-apart linear first and second side walls extending between the top and bottom walls to define an air passageway with a V-shaped configuration having an inlet and outlet, and wherein the side walls diverge from the inlet to the outlet;
a first air deflection member, comprising an elongated first panel having opposite proximal and distal end portions, and a flange extending from the first panel distal end portion at an angle substantially transverse to the first panel, wherein the first panel proximal end is pivotally secured to the housing at the first side wall and upstream from the first panel distal end such that the first air deflection member is movable between a first position wherein the first panel is in face-to-face relationship with the first side wall and a second position wherein the first panel extends in a direction that is transverse to the first side wall; and
a second air deflection member, comprising an elongated second panel having opposite proximal and distal end portions, and a flange extending from the second panel distal end portion at an angle substantially transverse to the second panel, wherein the second panel proximal end is pivotally secured to the housing at the second side wall and upstream from the second panel distal end such that the second air deflection member is movable between a first position wherein the second panel is in face-to-face relationship with the second side wall and a second position wherein the second panel extends in a direction that is transverse to the second side wall;
wherein an air stream flowing through the air passageway causes the first and second air deflection members to oscillate between respective first and second positions, and wherein oscillation of the first and second air deflection members imparts a sweeping motion on the air stream as the air stream exits from the outlet.

21. The vehicle of claim 20, wherein the first panel and flange of the first air deflection member are substantially orthogonal, and wherein the second panel and flange of the second air deflection member are substantially orthogonal.

22. The vehicle of claim 20, wherein the first panel is in face-to-face contacting relationship with the first side wall when the first air deflection member is in a respective first position, and wherein the second panel is in face-to-face contacting relationship with the second side wall when the second air deflection member is in a respective first position.

* * * * *

UNITED STATES PATENT AND TRADEMARK OFFICE
CERTIFICATE OF CORRECTION

PATENT NO. : 7,278,912 B2  Page 1 of 1
APPLICATION NO. : 11/046966
DATED : October 9, 2007
INVENTOR(S) : Gehring et al.

It is certified that error appears in the above-identified patent and that said Letters Patent is hereby corrected as shown below:

Column 9, Line 18: Please correct "duet"
To read -- duct --

Signed and Sealed this

Twenty-fifth Day of December, 2007

JON W. DUDAS
*Director of the United States Patent and Trademark Office*